(12) United States Patent
Shigemitsu et al.

(10) Patent No.: US 11,740,394 B2
(45) Date of Patent: Aug. 29, 2023

(54) POWER PRISM FOR FOLDED LENSES

(71) Applicant: Apple Inc., Cupertino, CA (US)

(72) Inventors: Norimichi Shigemitsu, Yokohama (JP); Kazuya Fujita, Yokohama (JP); Hideki Tanaka, Yokohama (JP); Shuo Wei Huang, Yokohama (JP)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/664,374

(22) Filed: May 20, 2022

(65) Prior Publication Data

US 2022/0350058 A1 Nov. 3, 2022

Related U.S. Application Data

(63) Continuation of application No. 16/551,521, filed on Aug. 26, 2019, now Pat. No. 11,340,388.

(60) Provisional application No. 62/726,163, filed on Aug. 31, 2018.

(51) Int. Cl.
*G02B 5/04* (2006.01)
*G02B 7/02* (2021.01)

(52) U.S. Cl.
CPC .............. *G02B 5/04* (2013.01); *G02B 7/02* (2013.01)

(58) Field of Classification Search
CPC ........ G02B 5/04; G02B 7/02; G02B 13/0085; G02B 13/007; G02B 17/006; G02B 17/08; G02B 7/1805; B29D 11/00
See application file for complete search history.

(56) References Cited

U.S. PATENT DOCUMENTS

| 7,458,735 | B2 | 12/2008 | Souma et al. |
| 7,515,345 | B2 | 4/2009 | Heimer |
| 11,340,388 | B2 | 5/2022 | Shigemitsu et al. |
| 2015/0160438 | A1 | 6/2015 | Okuda |
| 2015/0212337 | A1* | 7/2015 | Nomura ............... G02B 13/009 348/208.11 |

(Continued)

FOREIGN PATENT DOCUMENTS

CN 104898353 9/2015

OTHER PUBLICATIONS

Office action from Chinese Application No. 201910811044.5, dated May 24, 2021, (English translation and Chinese Version), pp. 1-22.

*Primary Examiner* — Darryl J Collins
*Assistant Examiner* — Matthew Y Lee
(74) *Attorney, Agent, or Firm* — Robert C. Kowert; Kowert, Hood, Munyon, Rankin & Goetzel, P.C.

(57) ABSTRACT

An optical power prism that may be used in folded lens systems that consists of a glass prism and a glass lens attached to a surface of the prism using a thin layer of optical glue or by optical contact. The glass lens does not have a flange and thus the prism can be smaller than prisms used in conventional power prisms with the same lens effective area, thus reducing the Z-height of the power prism when compared to conventional power prisms. An optical glass may be used for the lens that has a higher refractive index than can be provided by optical plastic which allows the lens to be thinner than plastic lenses. The lenses may be formed by molding a glass wafer to form lens shapes on a first surface of the wafer; the molded wafer is then ground from a second surface to singulate the lenses.

20 Claims, 15 Drawing Sheets

(56) References Cited

U.S. PATENT DOCUMENTS

| | | | |
|---|---|---|---|
| 2015/0253647 A1* | 9/2015 | Mercado | G02B 13/002 359/708 |
| 2016/0025932 A1* | 1/2016 | Shi | G02B 6/4208 385/33 |
| 2017/0108670 A1* | 4/2017 | Ko | G02B 13/0065 |

* cited by examiner

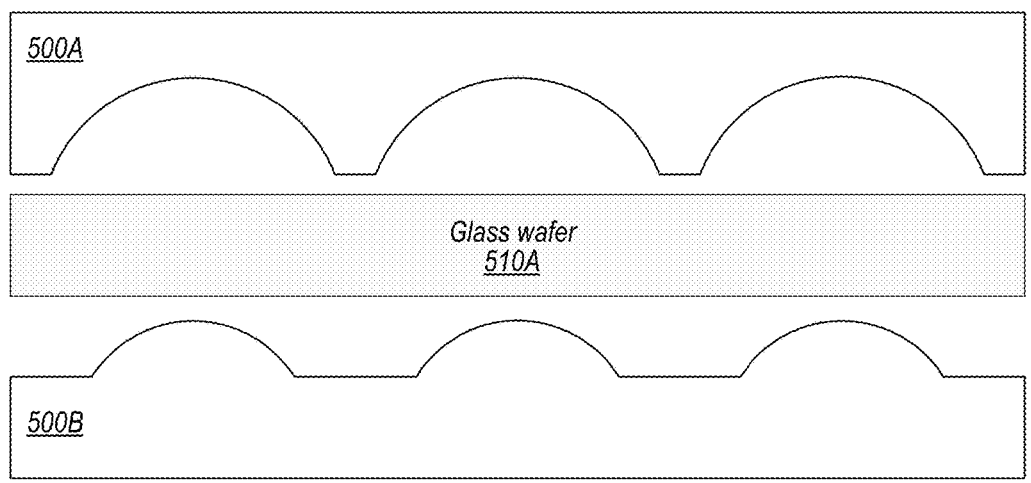
*FIG.5A*
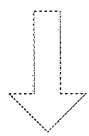
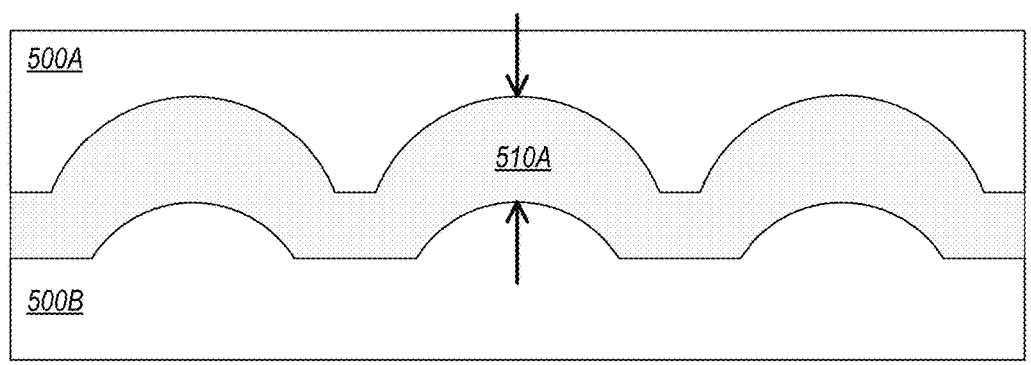
*FIG.5B*
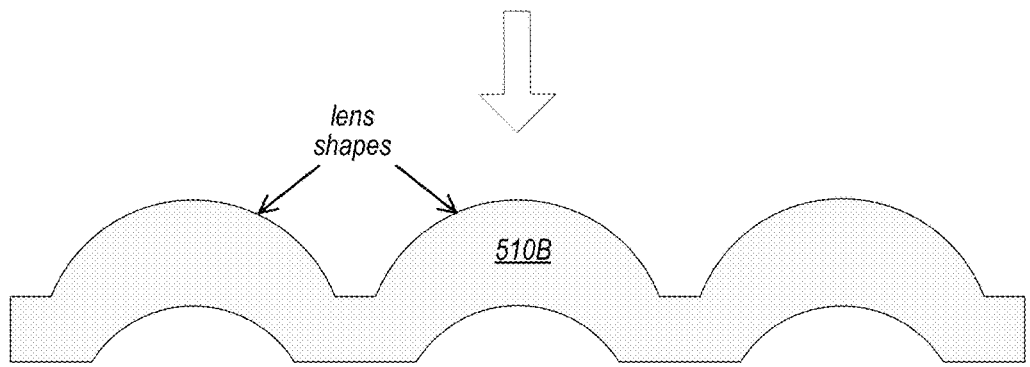
*FIG.5C*

Singulated glass lenses 570

Singulated glass lenses 570

Prisms 580

Power prisms 590

```
┌─────────────────────────────────────────────────────────────────────────┐
│ Light from an object field is received through an aperture stop at a power prism on a first │
│                                    axis.                                │
│                                    2000                                 │
└─────────────────────────────────────────────────────────────────────────┘
                                      │
                                      ▼
┌─────────────────────────────────────────────────────────────────────────┐
│    The power prism refracts the light and redirects the light to a second axis.    │
│                                    2010                                 │
└─────────────────────────────────────────────────────────────────────────┘
                                      │
                                      ▼
┌─────────────────────────────────────────────────────────────────────────┐
│  The light is refracted by one or more lens elements on the second axis to a second prism.  │
│                                    2020                                 │
└─────────────────────────────────────────────────────────────────────────┘
                                      │
                                      ▼
┌─────────────────────────────────────────────────────────────────────────┐
│ The light is redirected by the second prism to form an image at an image plane proximate │
│              to the surface of a Image sensor on a third axis.           │
│                                    2030                                 │
└─────────────────────────────────────────────────────────────────────────┘
```

*FIG. 8*

A glass wafer is molded to form a plurality of lens shapes on a first surface of the wafer.
2100

The molded glass wafer is ground from a second surface to produce singulated glass lenses with no flanges.
2110

The singulated lenses are attached to surfaces of glass prisms using optical glue or optical contact to produce power prisms.
2120

FIG. 9

POWER PRISM FOR FOLDED LENSES

PRIORITY INFORMATION

This application is a continuation of U.S. patent application Ser. No. 16/551,521, filed Aug. 26, 2019, which claims benefit of priority of U.S. Provisional Application Ser. No. 62/726,163, filed Aug. 31, 2018, the content of which are incorporated by reference herein in their entirety.

BACKGROUND

Technical Field

This disclosure relates generally to camera systems, and more specifically to power prisms for folded lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of an image sensor with small pixel size and a good, compact imaging lens system. Advances in technology have achieved reduction of the pixel size in image sensors. However, as image sensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of an optical prism with refractive power for folded lens systems are described that may, for example, be used in small form factor cameras in mobile multipurpose devices such as smartphones and tablet or pad devices. A folded lens system may include one or more prisms and a lens stack including one or more refractive lens elements. A first prism redirects light from a first optical axis to a second optical axis to thus provide a "folded" optical axis for the lens system. Using a prism to fold the optical axis may, for example, reduce the Z-height of the lens system, and thus may reduce the Z-height of a camera that includes the lens system. In some folded lens systems, a second prism may be located at the image side of the lens stack to fold the optical axis on to a third axis.

In some folded lens systems, a prism with refractive power (referred to as a power prism) may be used. For example, in some camera designs, a folded lens system may require a lens on the object side of the first prism. Instead of using a separate lens on the object side of the prism, a power prism composed of a prism and a lens deposited on or attached to the object side surface of the prism may be used. An advantage of the power prism is that the convex object side surface of the lens can be positioned closer to the surface of the prism than can be done using a separate lens, thus reducing Z-height of the folded lens system.

Conventionally, power prisms for folded lens systems are formed using a replication process in which a plastic material is deposited on a surface of a prism, formed into a lens shape, and cured using UV light, or alternatively using a process in which a plastic lens is formed using an injection molding process and attached to a surface of the prism. However, these conventional processes cause a flange to be formed around the plastic lens, which requires the surface of the prism to be large enough to accommodate the flange. The size of the surface of the prism to which the lens is attached dictates the size of the prism. As the dimensions of the surface of the prism on which the plastic lens with flange is attached increase, the Z-height of the prism, and thus the Z-height of the power prism including the lens, increases.

Embodiments of a power prism are described that may be used in folded lens systems. The power prism consists of a glass prism and a glass lens attached to a surface of the prism using optical glue or by optical contact. The glass lens does not have a flange. Since the glass lens does not have a flange, the dimensions of the prism to which the glass lens is attached can be smaller than the dimensions of a prism to which a plastic lens with flange is attached. Since the dimensions of the surface of the prism to which the glass lens is attached are decreased, the Z-height of the prism, and thus the Z-height of the power prism including the lens, is decreased. Thus, embodiments of the power prism described herein may provide reduced Z-height when compared to power prisms formed using conventional methods.

Further, eliminating the flange allows the glass lenses to be thinner than the plastic lenses formed by conventional methods. In addition, a glass material may be used for the lens of the power prism that has a higher refractive index than can be provided by the plastic material used in conventional methods. The higher refractive index allows the glass lenses to be thinner than the plastic lenses formed by conventional methods. Thus, in addition to reducing Z-height of the power prism by reducing Z-height of the prism, embodiments of the power prism described herein may also reduce Z-height by reducing thickness of the lens.

Embodiments of a method of manufacturing power prisms are described in which the glass lenses are formed by a process in which a glass wafer is molded to form lens shapes on a first surface of the wafer, and the molded wafer is then ground from a second surface to singulate or separate the glass lenses. The glass lenses thus formed do not have flanges. The singulated glass lenses are then attached to the surfaces of glass prisms using a thin layer of optical glue or by optical contact to form the power prisms. In embodiments that use optical glue to attach the lens to the prism, thickness of the glue, and thus spacing between the plano surface of the lens and the surface of the prism may be <10 microns. In embodiments that use optical contact to attach the lens to the prism, spacing between the plano surface of the lens and the surface of the prism may be <5 microns.

BRIEF DESCRIPTION OF THE DRAWINGS

FIGS. 5A through 5G illustrate a method of manufacture for a power prism as illustrated in FIG. 3, according to some embodiments.

FIG. 8 is a flowchart of a method for capturing images using embodiments of a folded lens system that includes a power prism, according to some embodiments.

FIG. 9 is a flowchart of a method for manufacturing a power prism as illustrated in FIG. 3, according to some embodiments.

Figure 1:
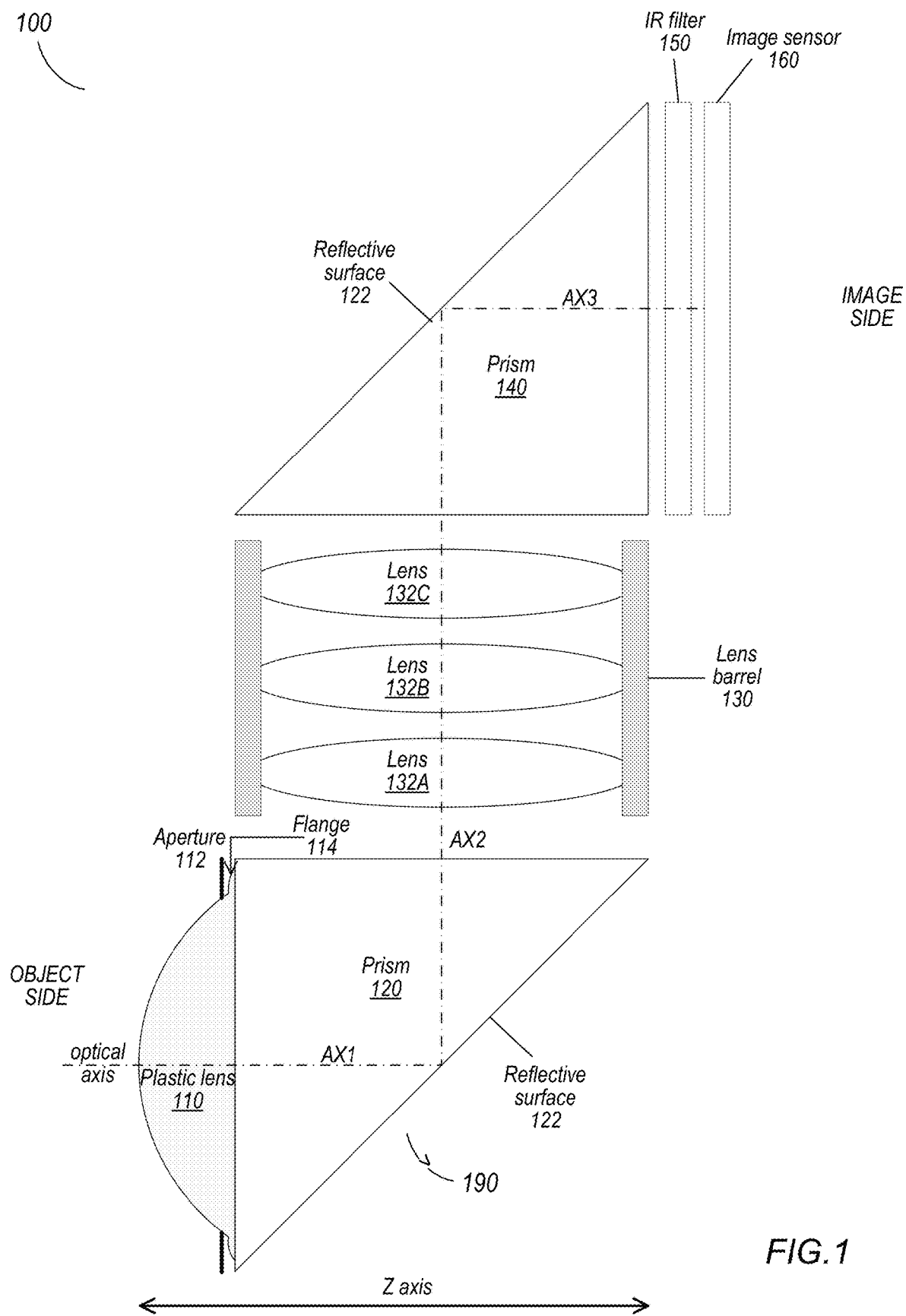
FIG. 1 illustrates a camera with a folded lens system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of an optical prism with refractive power for folded lens systems are described that may, for example, be used in small form factor cameras in mobile multipurpose devices such as smartphones and tablet or pad devices. A folded lens system may include one or more prisms and a lens stack including one or more refractive lens elements. A first prism redirects light from a first optical axis to a second optical axis to thus provide a "folded" optical axis for the lens system. Using a prism to fold the optical axis may, for example, reduce the Z-height of the lens system, and thus may reduce the Z-height of a camera that includes the lens system. In some embodiments, a second prism may be located at the image side of the lens stack to fold the optical axis on to a third axis.

In some folded lens systems, a prism with refractive power (referred to as a power prism) may be used. For example, in some camera designs, a folded lens system may require a lens on the object side of the first prism. Instead of using a separate lens on the object side of the prism, a power prism composed of a prism and a lens deposited on or attached to the object side surface of the prism may be used. An advantage of the power prism is that the convex object side surface of the lens can be positioned closer to the surface of the prism than can be done using a separate lens, thus reducing Z-height of the folded lens system.

Conventionally, power prisms for folded lens systems are formed using a replication process in which a plastic material is deposited on a surface of a prism, formed into a lens shape, and cured using UV light, or alternatively using a process in which a plastic lens is formed using an injection molding process and attached to a surface of the prism. However, these conventional processes cause a flange to be formed around the plastic lens, which requires the surface of the prism to be large enough to accommodate the flange. The size of the surface of the prism on which the lens is attached dictates the size of the prism. As the dimensions of the surface of the prism on which the plastic lens with flange is attached increase, the Z-height of the prism, and thus the Z-height of the power prism including the lens, increases. A goal in small form factor cameras is to reduce Z-height of the cameras for use in thin mobile multipurpose devices. A limiting factor on Z-height in conventional folded lens systems is the Z-height of these conventional power prisms.

An optical prism with refractive power (referred to herein as a power prism) is described that may be used in folded lens systems. The power prism consists of a glass prism and a glass lens attached to a surface of the prism. In some embodiments, instead of using a replication process or injection molding process to form a plastic lens for a power prism, a process is used in which a glass wafer is molded to form lens shapes on a first surface of the wafer, and the molded wafer is then ground from a second surface to singulate or separate the glass lenses. The glass lenses thus formed do not have flanges. The singulated glass lenses are then attached to the surfaces of glass prisms using a thin layer (<10 microns) of optical glue or by optical contact.

Since the glass lenses do not have flanges, the surface of the prisms to which the glass lenses are attached can be smaller than the prisms used in conventional power prisms as described above, and the power prisms formed by attaching the glass lenses to the prisms are smaller than the conventional power prisms described above. Since the dimensions of the surface of the prism to which the glass lens is attached are decreased, the Z-height of the prism, and thus the Z-height of the power prism including the lens, is decreased.

In addition to reducing the size of the prism by eliminating the added width of the flange, eliminating the thickness of the flange allows the glass lenses to be thinner than the plastic lenses formed by conventional methods. In addition, a glass material may be used for the lens that has a higher refractive index than can be provided by the plastic material used to form lenses in conventional methods. The higher refractive index allows the glass lenses to be thinner than the plastic lenses formed by the conventional methods.

The prism and lens may be composed of optical glass. In some embodiments, the prism and lens may be composed of the same glass material. However, in some embodiments, the prism and lens may be composed of different glass materials. In some embodiments, the lens may be composed of a glass material with an Abbe number that is >45 to correct for color aberrations. In some embodiments, the prism may be composed of a glass material with a higher refractive index than the glass material used in the lens. In some embodiments, the lens may be composed of a glass material with a refractive index that is >1.5. In some embodiments, the prism may be composed of a glass material with a refractive index that is >1.7 to provide total internal reflection at the sloped reflective surface of the prism.

While embodiments of a power prism with a glass lens attached to the object side of a prism are described, in some embodiments a glass lens may instead or also be attached to the image side of a prism to form a power prism for use in a folded lens system. Further, while embodiments of a plano-convex glass lens attached to a prism are described, plano-concave or other types of lenses with a planar surface may also be attached to a prism. Note that the planar surface of a lens is attached to a surface of the prism.

FIG. 1 illustrates a camera that includes a folded lens system with a power prism, according to some embodiments. FIG. 1 illustrates components of a camera 100 that includes a folded lens system with two prisms 120 and 140 with one or more refractive lenses 132 (three lenses 132A, 132B, and 132C, in this example) located in a lens barrel 130 between prisms 120 and 140. The prisms 120 and 140 provide a "folded" optical axis for the camera 100. A reflective surface 122 of a first prism 120 redirects light from an object field from a first axis (AX1) to the lenses 132 on a second axis (AX2). The lenses 132 refract the light to a reflective surface 142 of a second prism 140 that redirects the light onto a third axis (AX3) on which an image sensor 160 of the camera 100 is disposed. The redirected light forms an image at an image plane at or near the surface of the image sensor 160. The camera 100 may, but does not necessarily, include an infrared (IR) filter 150, for example located between the second prism 140 and the image sensor 160. The camera 100 may also include an aperture stop 112, for example located on the object side of the first prism 120. The number, shapes, materials, and arrangements of the refractive lens elements 132 in the lens barrel 130 may be selected according to the requirements of the particular camera 100.

As shown in the example camera 100 of FIG. 1, in some folded lens systems, a prism with refractive power (referred to as a power prism 190) may be used. In this example, to form the power prism 190, a lens 110 has been deposited on the object side of prism 120 using a replication process in which a plastic material is deposited on a surface of prism 120, formed into a lens shape, and cured using UV light. Alternatively, to form the power prism 190, a plastic lens 110 may be formed using an injection molding process and attached to a surface of the prism 120. However, these processes causes a flange 114 to be formed around the plastic lens 110, which requires the surface of the prism 120 to be large enough to accommodate the flange 114. The size of the surface of the prism 120 on which the lens 110 is attached dictates the size of the prism 120. As the dimensions of the surface of the prism 120 on which the lens 110 is attached increase, the Z-height of the prism 120, and thus the Z-height of the power prism 190 including the lens 110, increases. A goal in small form factor cameras is to reduce Z-height of the cameras for use in thin mobile multipurpose devices. A limiting factor on Z-height in conventional folded lens systems is the Z-height of these conventional power prisms 190.

Figure 2:
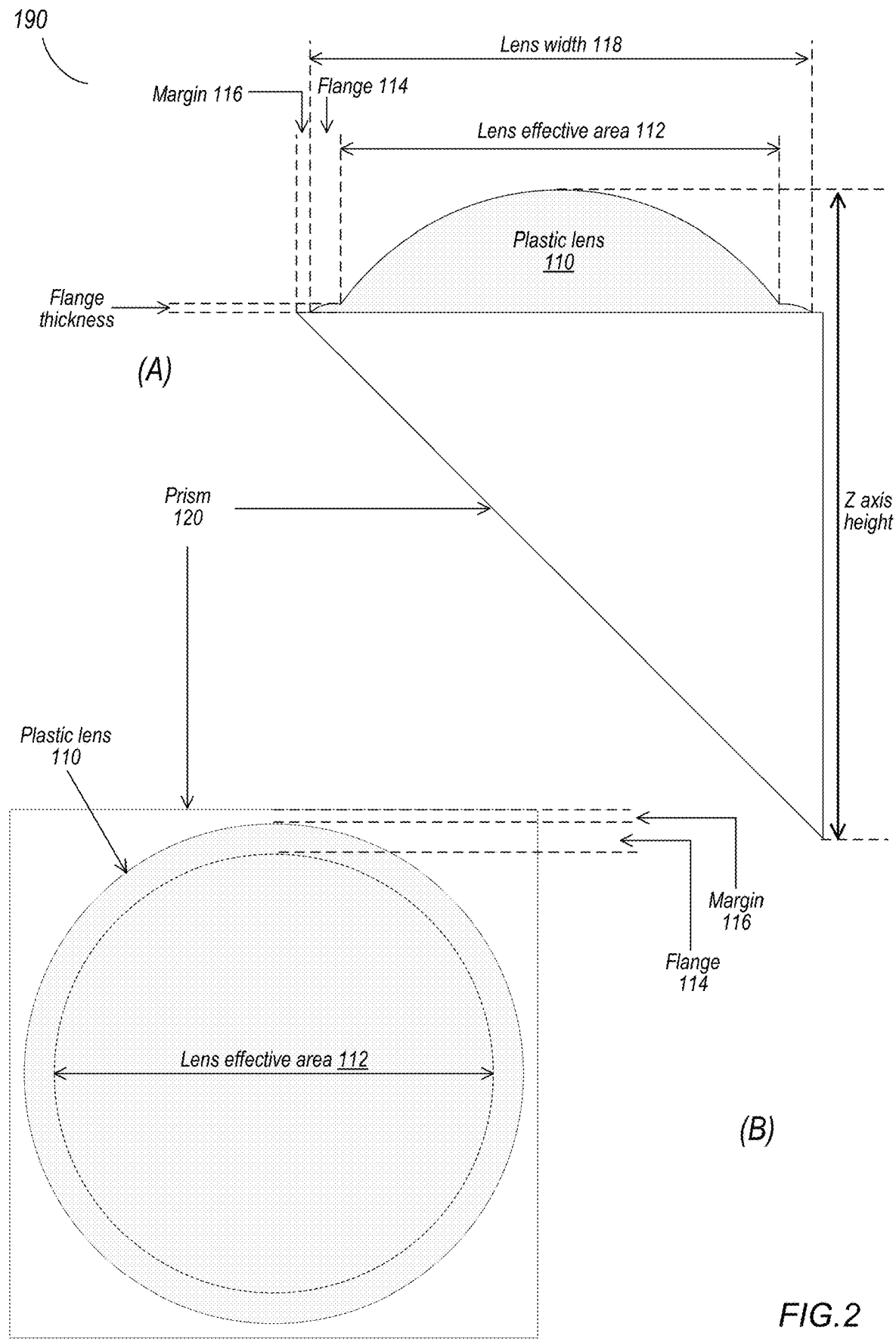
FIG. 2 illustrates a conventional power prism formed by a process that deposits a plastic lens on a surface of a prism.

FIG. 2 illustrates a conventional power prism 190 formed by a replication process that deposits a plastic lens 110 (referred to as a plastic lens) on a surface of a prism 120, or alternatively using a process in which a plastic lens 110 is formed using an injection molding process and attached to a surface of the prism 120. FIG. 2 shows a side view (A) and a top view (B) of the power prism 190. As can be seen in FIG. 2, the process forms a flange 114 around the effective area 112 of the plastic lens 110. The effective area of a lens may be defined by the effective diameter of the lens. In optics, the effective diameter of a lens may be defined as twice the distance from the geometric center of the lens to the edge of the lens shape (in this example, a plano-convex lens shape). In an optical system including an aperture and a sensor, the aperture and focal length of the optical system determine the cone angle of a bundle of rays that come to a focus at an image plane at or near the sensor. The effective area of a lens in the optical system is or contains the region of the lens in which ray bundles limited by the aperture are affected by the lens. The flange 114 extends outwards from the edge of the lens 110 shape. In addition, a margin 116 may be required around the flange 114 to accommodate slight variations in the manufacturing process. The total diameter of the lens 110 is the width 118 at the flange 114 (i.e., the effective diameter of the lens 110 plus twice the width of the flange 114). The width 118 of the lens 110 at the flange 114 requires the surface of the prism 120 on which the lens 110 is attached to be large enough to accommodate the flange 114 plus the margin 116. The size of the surface of the prism 120 on which the lens 110 is attached dictates the size of the prism 120. As the dimensions of the surface of the prism 120 on which the plastic lens 110 is attached increase, the Z-height of the prism 120, and thus the Z-height of the power prism 190, increases. As a non-limiting example, prism 120 may have a Z-axis height of about 4 mm, and plastic lens 110 may have a total thickness of about 0.6 mm (including the thickness of the flange 114, e.g. 0.1 mm), for a total Z-axis height for power prism 190 of 4.6 mm.

Figure 3:
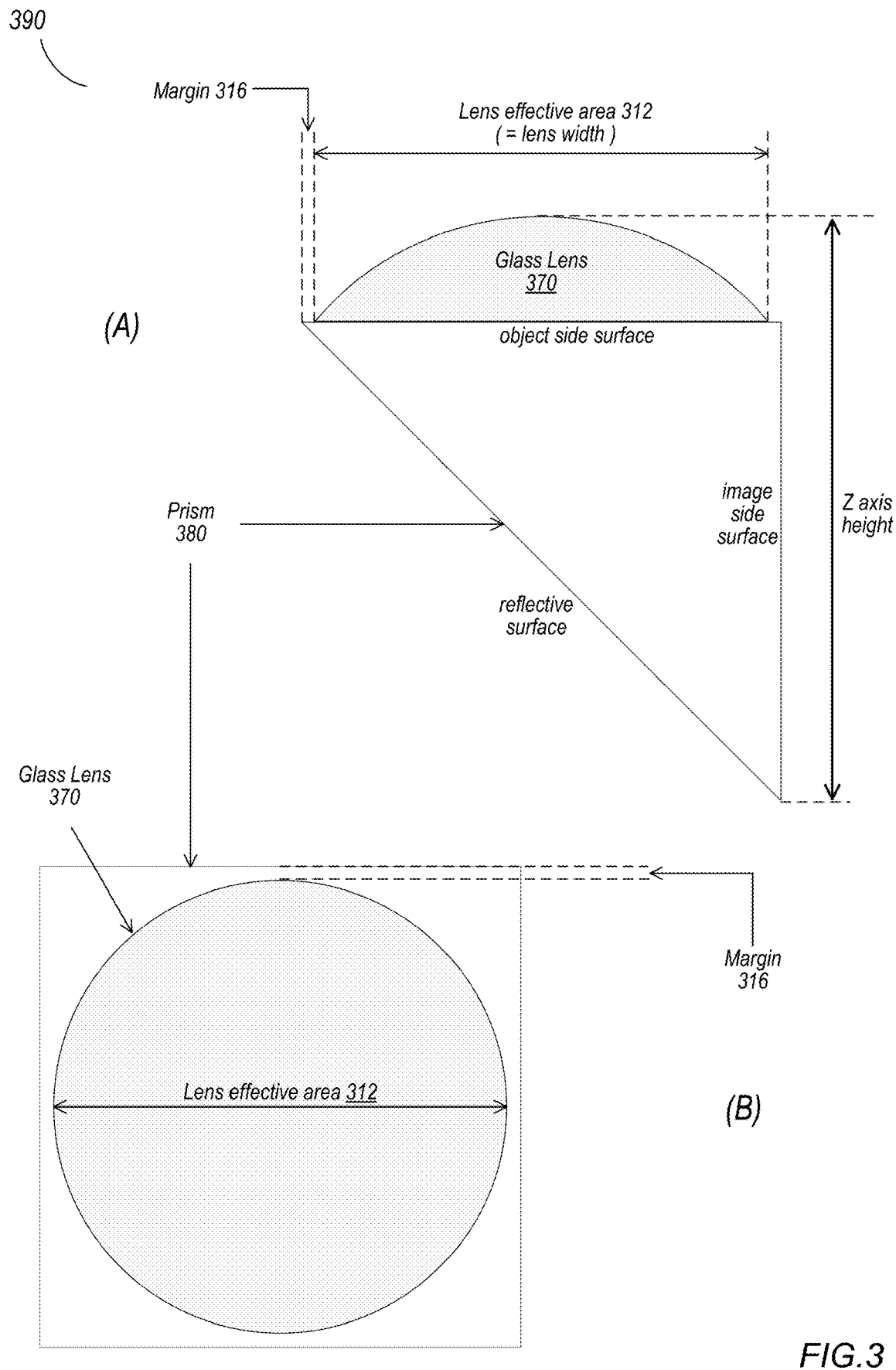
FIG. 3 illustrates a power prism formed by attaching a singulated glass lens to a surface of a prism, according to some embodiments.

FIG. 3 illustrates a power prism 390 formed by attaching a singulated glass lens 370 to a surface of a prism 380, according to some embodiments. FIG. 3 shows a side view (A) and a top view (B) of the power prism 390. As can be seen in FIG. 3, glass lens 370 is formed by a process that does not form a flange around the effective area 312 of the lens 370. An example method for forming glass lens 370 is illustrated in FIGS. 5A-5D and FIG. 9. The glass lens 370 may be attached to the prism 380 using a thin layer (<10 microns) of optical glue or by optical contact, as illustrated in FIGS. 5E-5G and FIG. 9. A margin 316 may be required around the lens 370 to accommodate slight variations in the manufacturing process. Since lens 370 does not have a flange, the diameter of the lens 370 is the width of the effective area 312 of the lens 370 (i.e., the lens effective diameter). By eliminating the flange, the surface of the prism 380 to which the glass lens 370 is attached can be smaller than the surface of the prism 120 on which a plastic lens 110 with the same effective area as glass lens 370 is deposited using a process as shown in FIG. 2. The size of the surface of the prism 120 on which the lens 110 is deposited dictates the size of the prism 120. Since the dimensions of the surface of the prism 380 to which the glass lens 370 is attached are decreased, the Z-height of the prism 380, and thus the Z-height of the power prism 390, is decreased when compared to the power prism 190 of FIG. 2.

In addition to reducing the Z-height of the prism 380 by eliminating the added width of the flange, eliminating the thickness of the flange may allow the glass lens 370 to be thinner than the plastic lens 110 formed by conventional methods. In addition, a glass material may be used for the lens 370 that has a higher refractive index than can be provided by the plastic material used to form lens 110. The higher refractive index allows the glass lens 370 to be thinner than the plastic lens 110 formed by conventional methods.

The prism 380 and lens 370 may be composed of optical glass. In some embodiments, the prism 380 and lens 370 may be composed of the same glass material. However, in some embodiments, the prism 380 and lens 370 may be composed of different glass materials. In some embodiments, the lens 370 may be composed of a glass material with an Abbe number that is >45 to correct for color aberrations. In some embodiments, the prism 380 may be composed of a glass material with a higher refractive index than the glass material used in the lens 370. In some embodiments, the lens 370 may be composed of a glass material with a refractive index that is >1.5. In some embodiments, the prism 380 may be composed of a glass material with a refractive index that is >1.7 to provide total internal reflection at the sloped reflective surface of the prism.

FIGS. 4A through 4D compare a power prism 390 as illustrated in FIG. 3 to a power prism 190 as illustrated in FIG. 2, according to some embodiments.

Figure 4A:
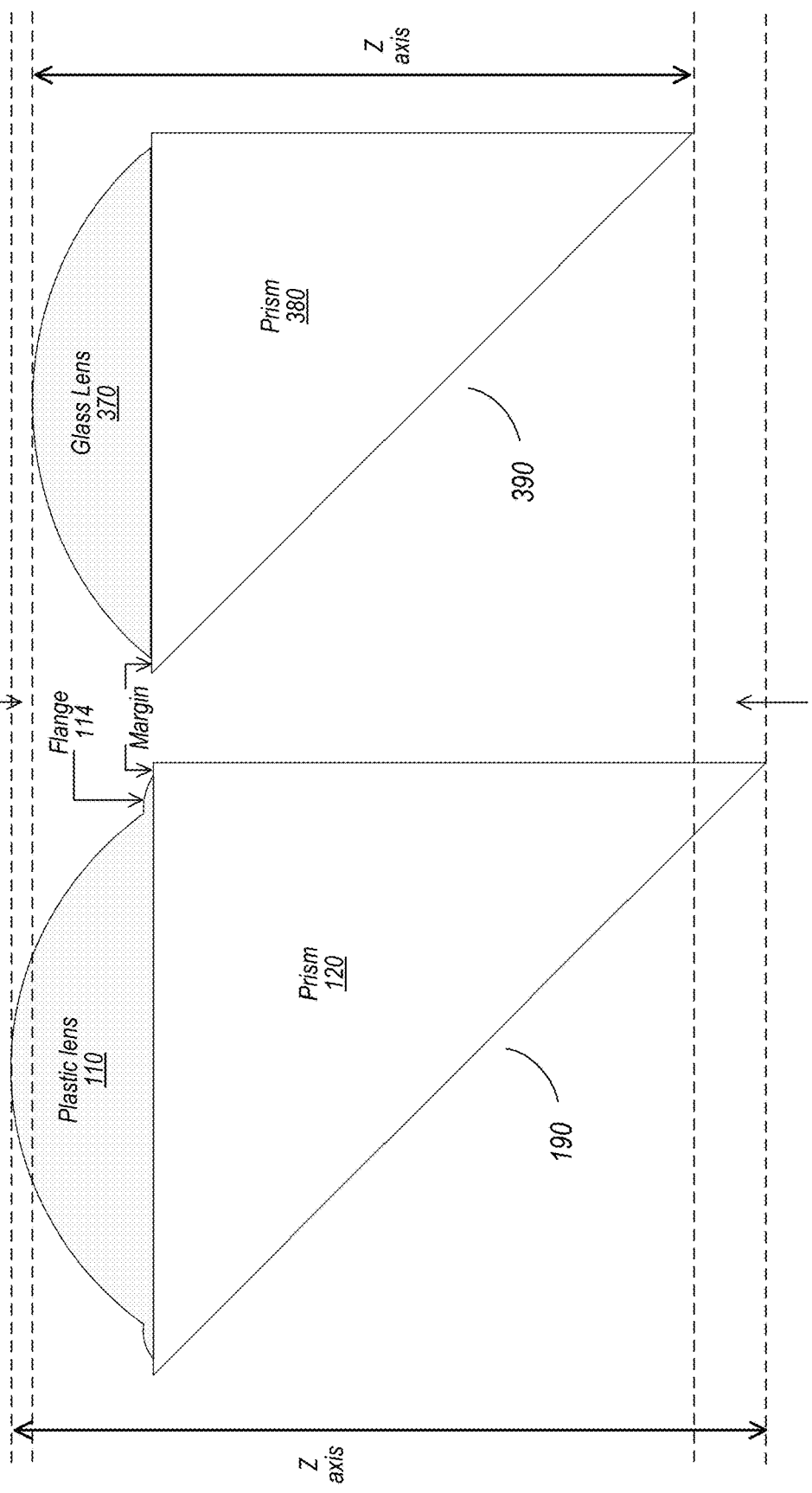
FIGS. 4A through 4D compare a power prism as illustrated in FIG. 3 to a power prism as illustrated in FIG. 2, according to some embodiments.

FIG. 4A shows a side view of power prism 190 and power prism 390. As can be seen in FIG. 4A, eliminating flange 114 allows a smaller prism 380 to be used in power prism 390 than the prism 120 used in power prism 190. Further, as can be seen in FIG. 4A, eliminating the thickness of the flange 114 allows the glass lens 370 to be thinner than the plastic lens 110 formed by conventional methods. In addition, a glass material may be used for the lens 370 that has a higher refractive index than can be provided by the plastic material used to form lens 110, which allows the glass lens 370 to be thinner than the plastic lens 110 formed by conventional methods. FIG. 4A shows the reduction in Z-height of power prism 390 when compared to power prism 190 due to the elimination of the flange 114 width, and also shows the reduction in Z-height of power prism 390 when compared to power prism 190 due to elimination of the thickness of the flange 114 combined with the higher refractive index of the glass material used in glass lens 370.

As a non-limiting example, prism 120 may have a Z-axis height of about 4 mm, and plastic lens 110 may have a total thickness of about 0.6 mm (including the thickness of the flange 114), for a total Z-axis height for power prism 190 of 4.6 mm. The total width of the flange 114 may be about 0.45 millimeters (mm) (0.225 mm on each side of the effective area), and thickness of the flange 114 may be about 0.1 mm Eliminating the width of the flange 114 may allow the Z-axis height of prism 380 (and thus the Z-axis height of power prism 390) to be reduced by about 0.45 mm. Thus, the Z-axis height of prism 380 may be about 3.55 mm Eliminating the thickness of the flange 114 may allow the thickness of lens 370 (and thus the Z-axis height of power prism 390) to be reduced by 0.1 mm. The higher refractive index of the glass material used in glass lens 370 may allow the thickness of lens 370 (and thus the Z-axis height of power prism 390) to be reduced by an additional 0.03 mm. Total reduction on the Z-axis is thus about 0.58 mm. Thus, Z-axis height of power prism 390 may be approximately 4.0 mm. Note, however, that power prisms 390 with larger or smaller Z-axis heights (e.g., within a range of 3 mm to 7 mm) may be provided.

Figure 4B:
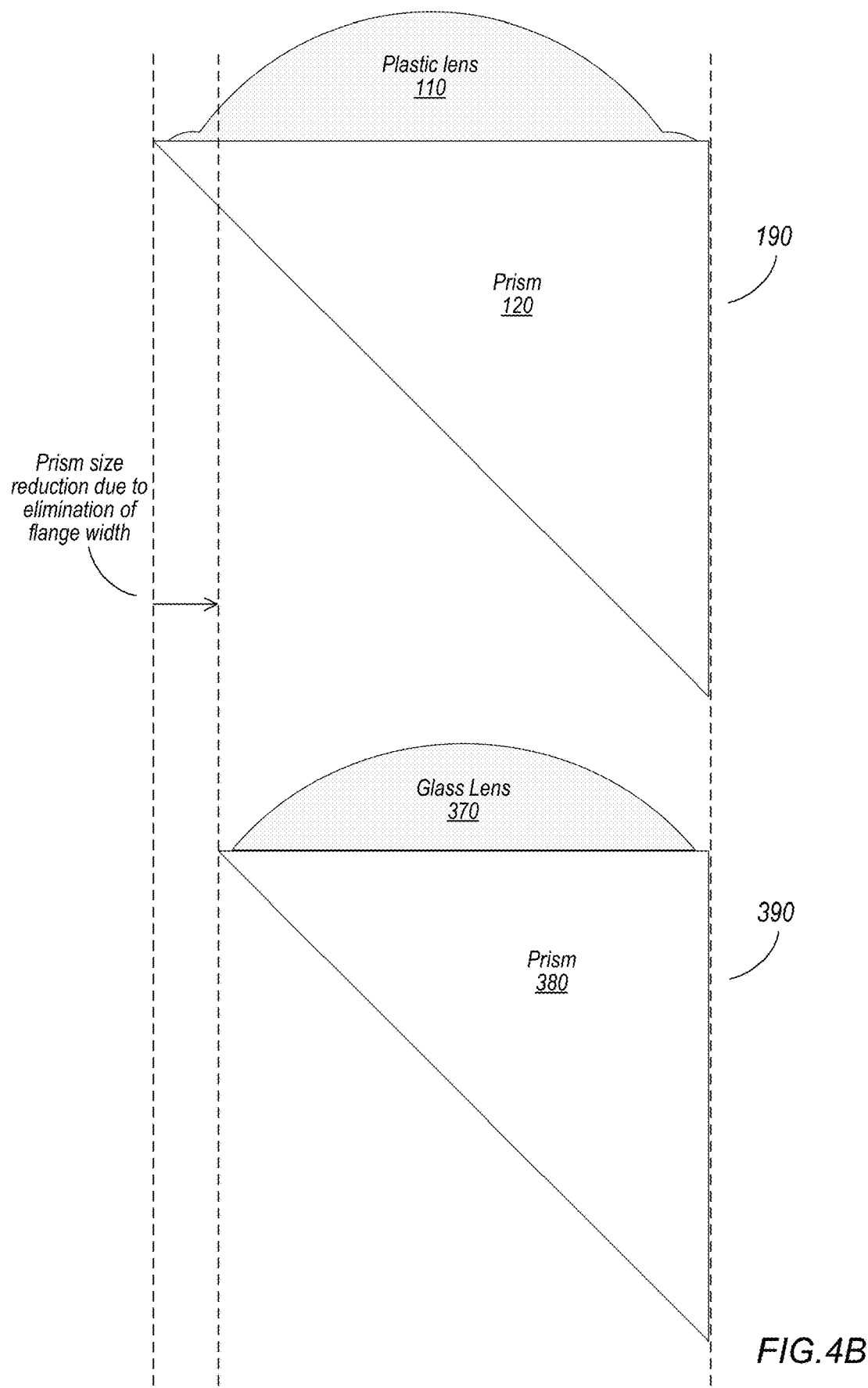

FIG. 4B shows a side view of power prism 190 and power prism 390. As can be seen in FIG. 4B, eliminating flange 114 allows a smaller prism 380 to be used in power prism 390 than the prism 120 used in power prism 190. In addition to reducing Z-height of the prism 390, eliminating the flange 114 also allows the prism 380 to be reduced in the other (X and Y axes) dimensions.

Figure 4C:
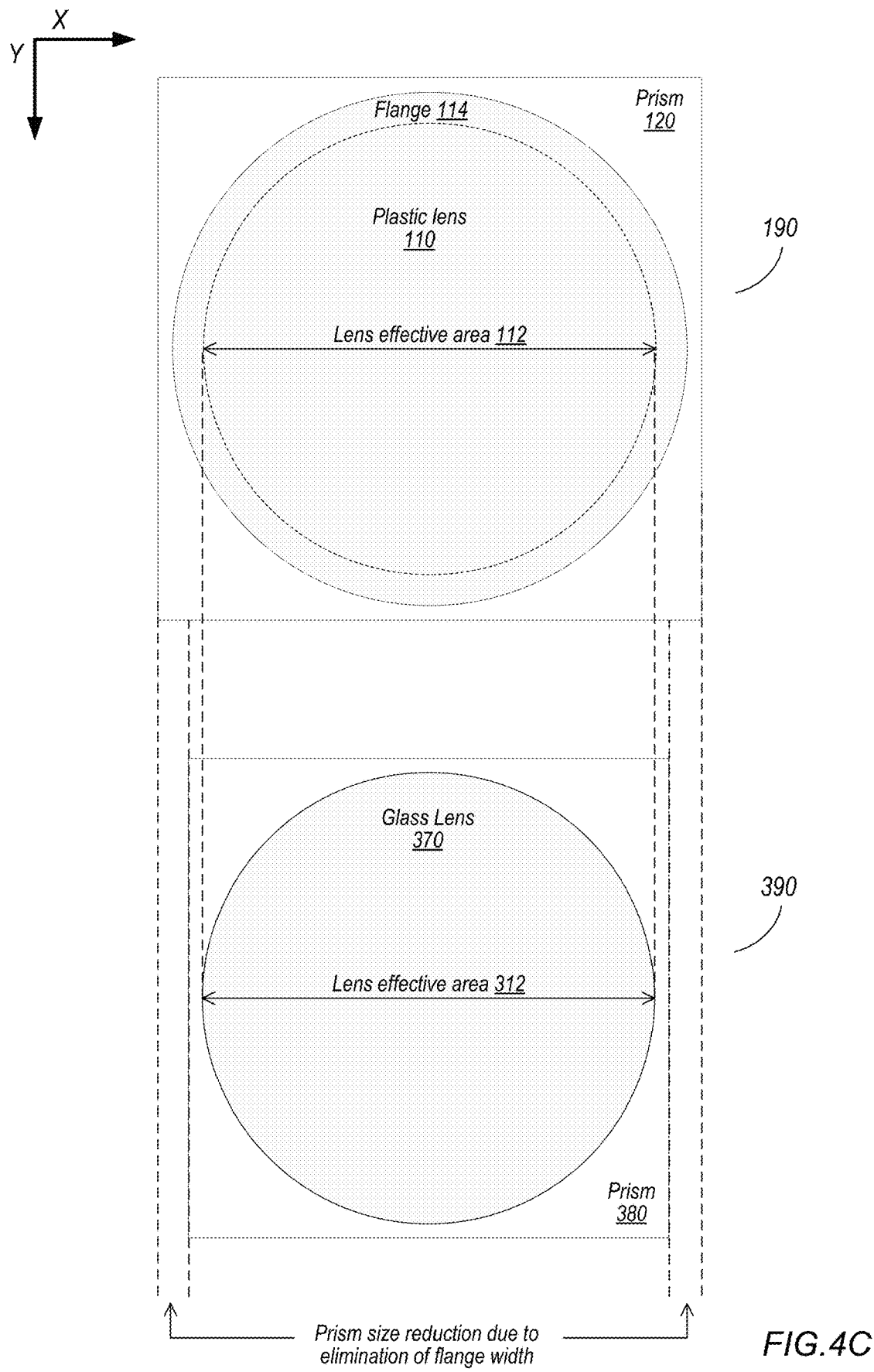
Figure 4D:
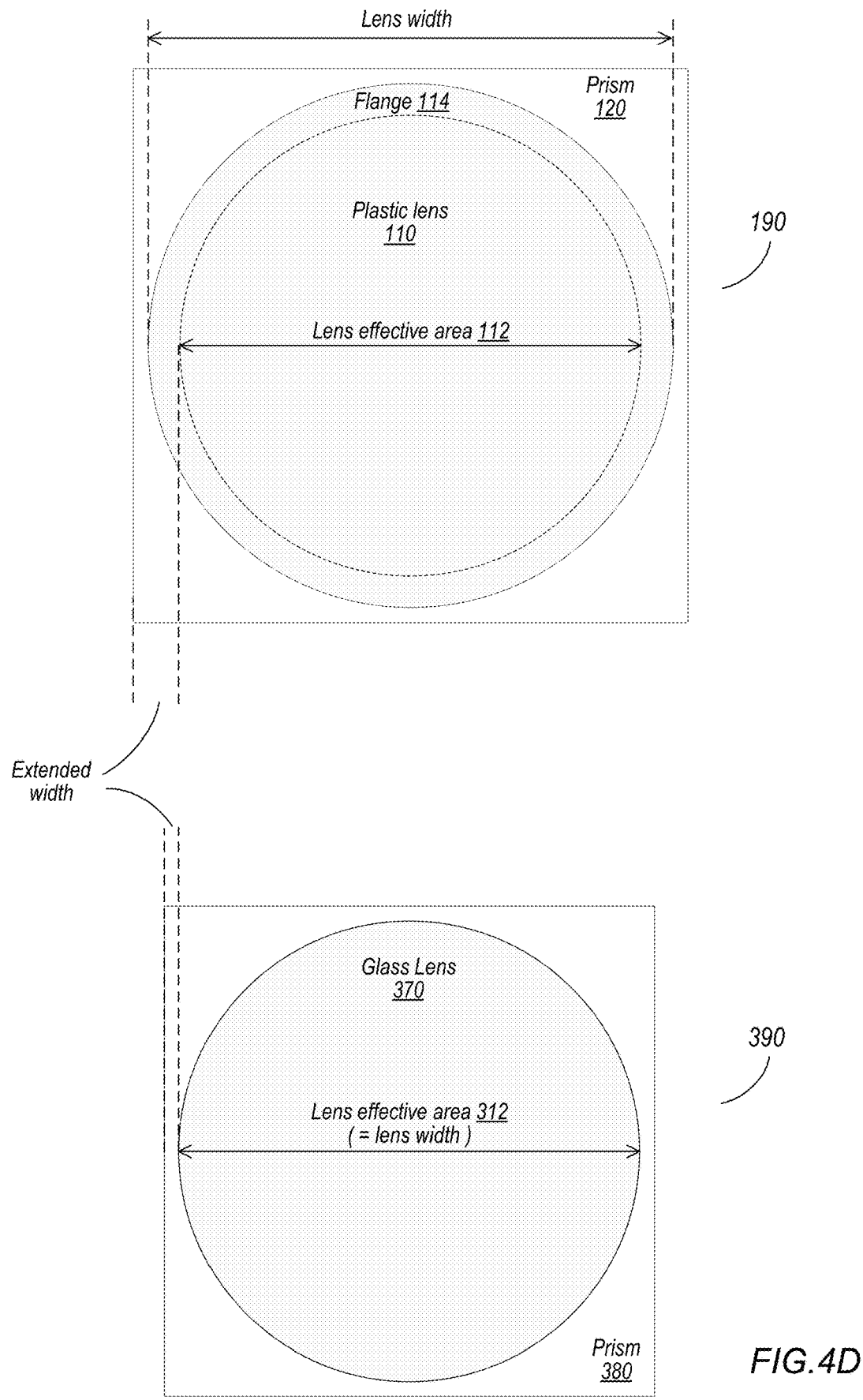

FIGS. 4C and 4D show a top view of power prism 190 and power prism 390. As can be seen in FIG. 4C, eliminating flange 114 allows the surface of prism 380 to which glass lens 370 is attached to be smaller than the surface of prism 120 on which plastic lens 110 is deposited while providing the same size effective area 312 in glass lens 370 as the effective area 112 of plastic lens 110. As can be seen in FIG. 4D, eliminating flange 114 reduces the extended width needed for prism 380. For prism 120, the extended width on one side is equal to the width of the flange plus the width of the margin. The total extended width is thus 2*(flange width+margin width). Given a flange width of 0.225 mm and a margin width of 0.05 mm, the total extended width for prism 120 is >0.5 mm. For prism 380, the total extended width is 2*margin width. Given a margin width of 0.05 mm, the total extended width for prism 380 is 0.1 mm, or more generally <0.2 mm Eliminating the flange 114 also allows the prism 380 to be reduced in X, Y and Z dimensions. Since the dimensions of prism 380 to which the glass lens 370 is attached are decreased, the Z-height of the power prism 390 is decreased when compared to the power prism 190.

FIGS. 5A through 5G illustrate a method of manufacture for a power prism as illustrated in FIG. 3, according to some embodiments. In this method, the glass lenses are formed by a process in which a glass wafer is molded to form lens shapes on a first surface of the wafer, and the molded wafer is then ground from a second surface to singulate or separate the glass lenses. The glass lenses thus formed do not have flanges. The singulated glass lenses are then attached to the surfaces of glass prisms using a thin layer of optical glue or by optical contact to form the power prisms. In embodiments that use optical glue to attach the lens to the prism, thickness of the glue, and thus spacing between the plano surface of the lens and the surface of the prism may be <10 microns. In embodiments that use optical contact to attach the lens to the prism, spacing between the plano surface of the lens and the surface of the prism may be <5 microns.

In FIG. 5A, an optical glass wafer 510A is positioned between a top mold 500A and a bottom mold 500B. In FIG.

Figure 5D:
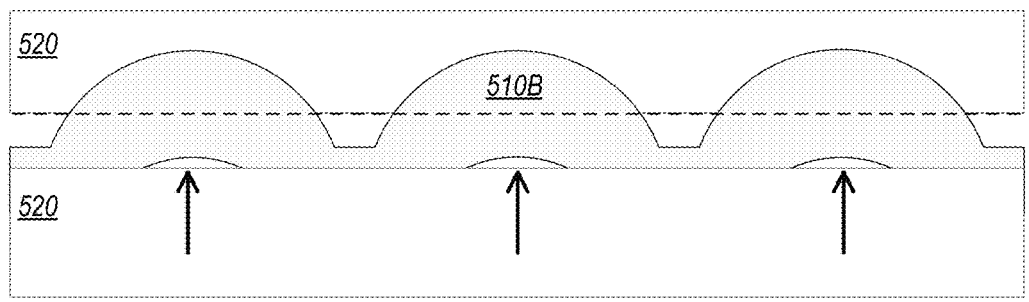
Figure 5E:
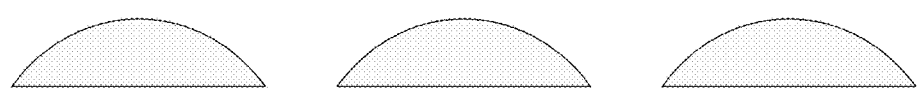
Figure 5F:
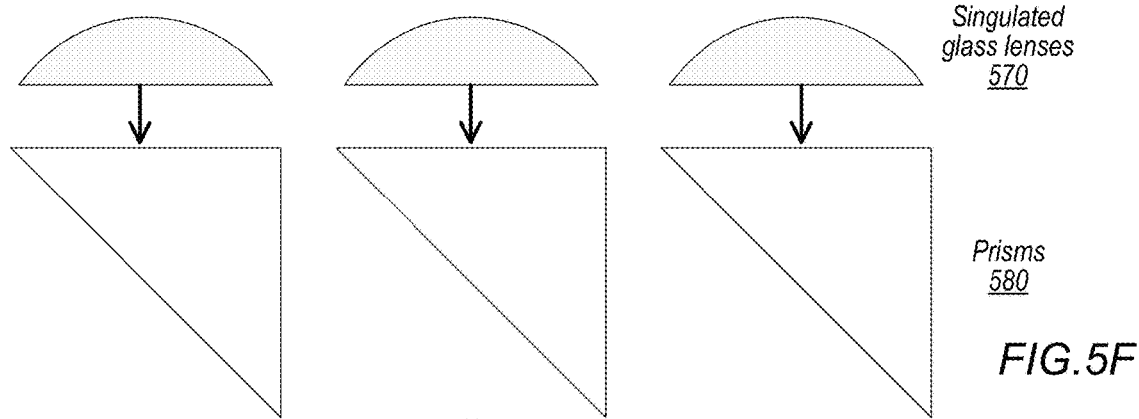
Figure 5G:
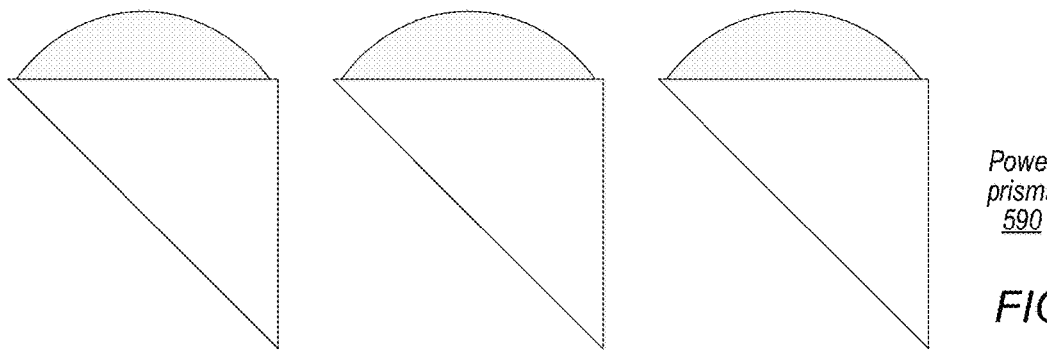

5B, the wafer 510A is pressed between molds 500A and 500B to form a molded glass wafer 510B that has the desired lens shapes on a first surface of the wafer 510B as shown in FIG. 5C. In FIG. 5D, the molded wafer 510B is positioned in a precision grinding and polishing mechanism 520 where it is ground and polished from a second surface to singulate or separate convex-plano glass lenses 570 as shown in FIG. 5E. In FIG. 5F, the singulated convex-plano glass lenses 570 are attached to a surface of glass prisms 580 using a thin layer (<10 microns) of optical glue or by optical contact to form power prisms 590 as shown in FIG. 5G. In some embodiments, an anti-reflective coating may be applied to at least one surface of the glass lenses prior to singulation by grinding, or alternatively after singulation.

The prisms 580 and lenses 570 may be composed of optical glass. In some embodiments, the prisms 580 and lenses 570 may be composed of the same glass material. However, in some embodiments, the prisms 580 and lenses 570 may be composed of different glass materials. In some embodiments, the lenses 570 may be composed of a glass material with an Abbe number that is >45 to correct for color aberrations. In some embodiments, the prisms 580 may be composed of a glass material with a higher refractive index than the glass material used in the lens. In some embodiments, the lenses 570 may be composed of a glass material with a refractive index that is >1.5. In some embodiments, the prisms 580 may be composed of a glass material with a refractive index that is >1.7 to provide total internal reflection at the sloped reflective surface of the prism.

FIGS. 6A through 6F illustrate various alternative embodiments of a power prism as illustrated in FIG. 3. While embodiments of a power prism with a glass lens attached to the object side of a prism are generally described, in some embodiments a glass lens may instead or also be attached to the image side of a prism to form a power prism for use in a folded lens system. Further, while embodiments of a plano-convex glass lens with positive refractive power attached to a prism are described, plano-concave or other types of lenses may also be attached to a prism.

Figure 6A:
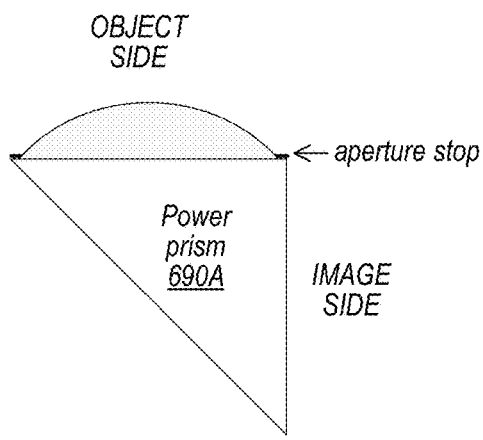
FIGS. 6A through 6F illustrate various alternative embodiments of a power prism as illustrated in FIG. 3.
Figure 6B:
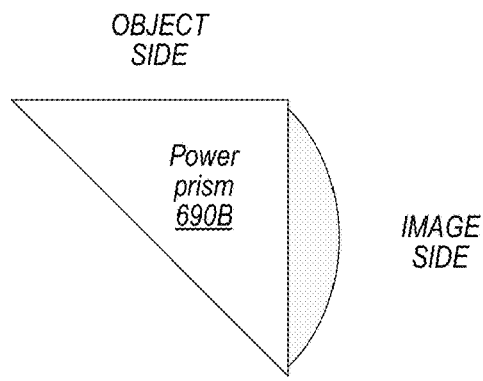
Figure 6C:
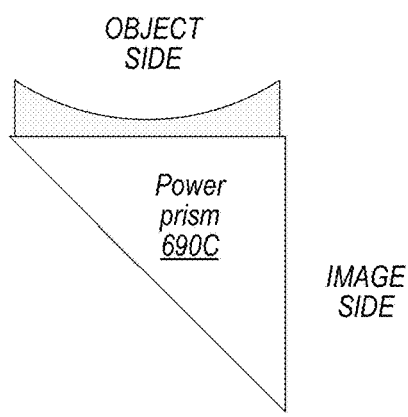
Figure 6D:
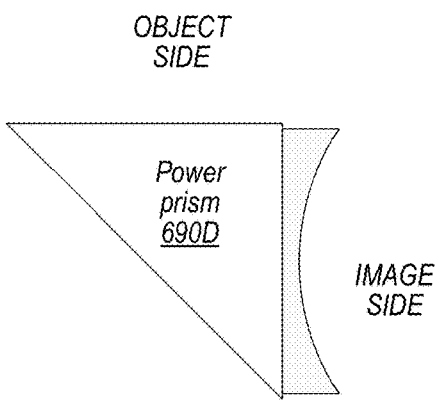
Figure 6E:
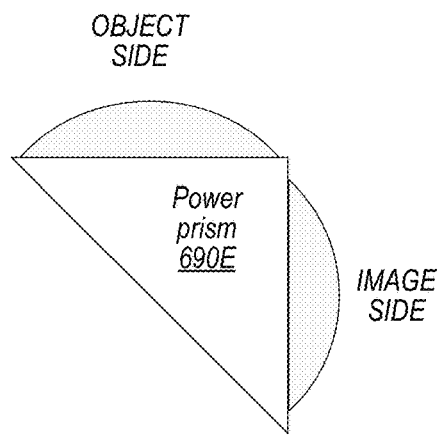
Figure 6F:
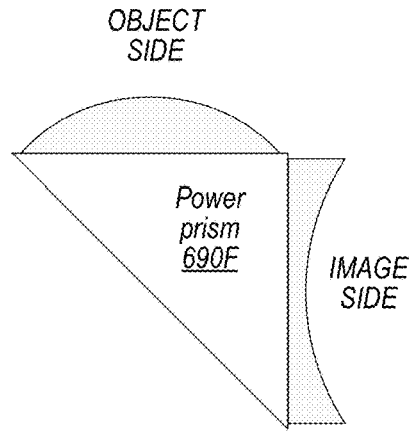

FIG. 6A shows a power prism 690A that consists of a plano-convex glass lens with positive refractive power attached to the object side of a prism. As shown in FIG. 6A, in some embodiments, the aperture stop may be located at the outer edge of the lens. FIG. 6B shows a power prism 690B that consists of a plano-convex glass lens with positive refractive power attached to the image side of a prism. FIG. 6C shows a power prism 690C that consists of a concave glass lens with negative refractive power attached to the object side of a prism. FIG. 6D shows a power prism 690D that consists of a concave glass lens with negative refractive power attached to the image side of a prism. FIG. 6E shows a power prism 690E that consists of a plano-convex glass lens with positive refractive power attached to the object side of a prism and a plano-convex glass lens with positive refractive power attached to the image side of the prism. FIG. 6F shows a power prism 690F that consists of a plano-convex glass lens with positive refractive power attached to the object side of a prism and a concave glass lens with negative refractive power attached to the image side of the prism.

Figure 7A:
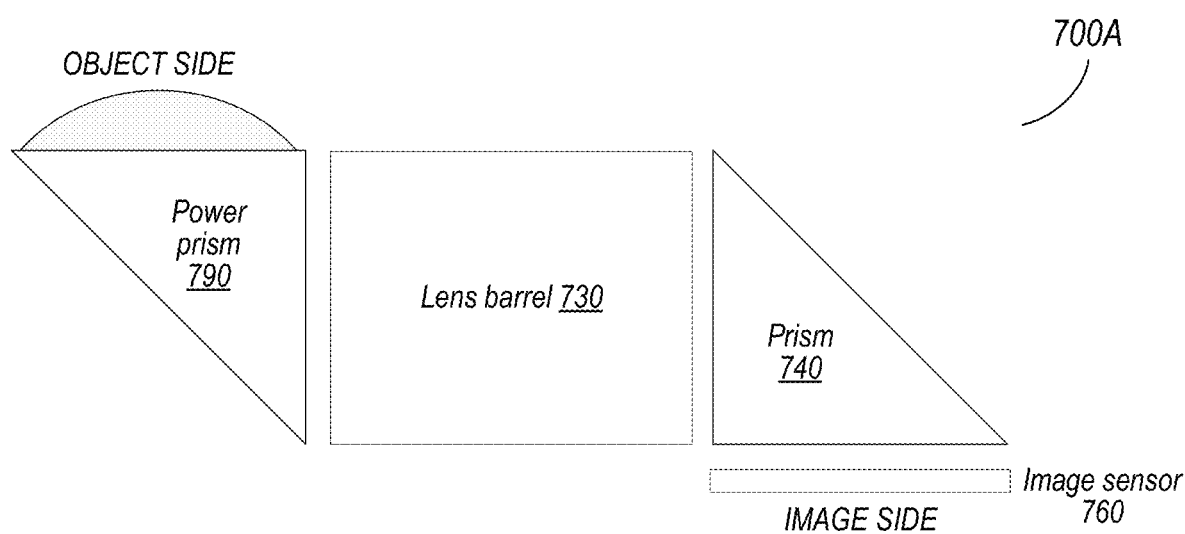
FIGS. 7A through 7D illustrate various embodiments of cameras with folded lens systems that include at least one power prism.
Figure 7B:
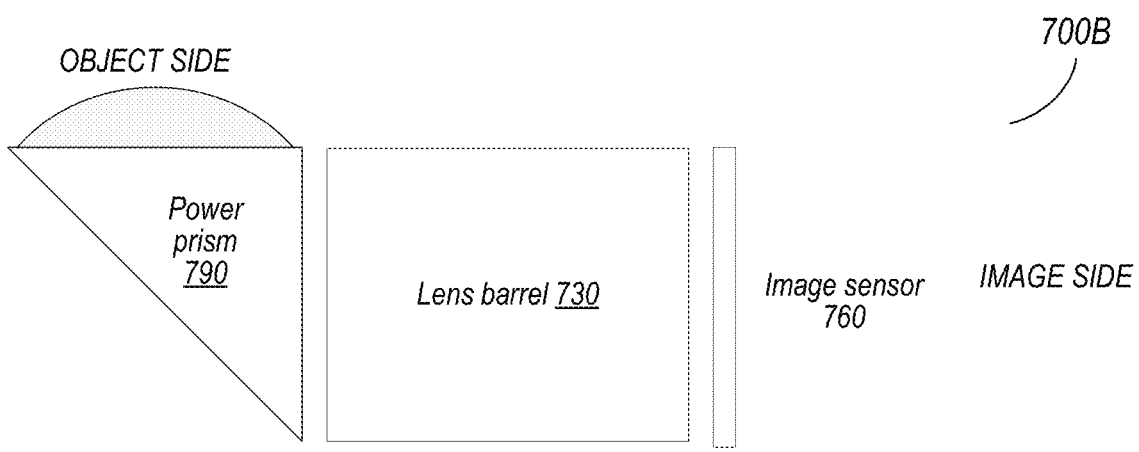
Figure 7C:
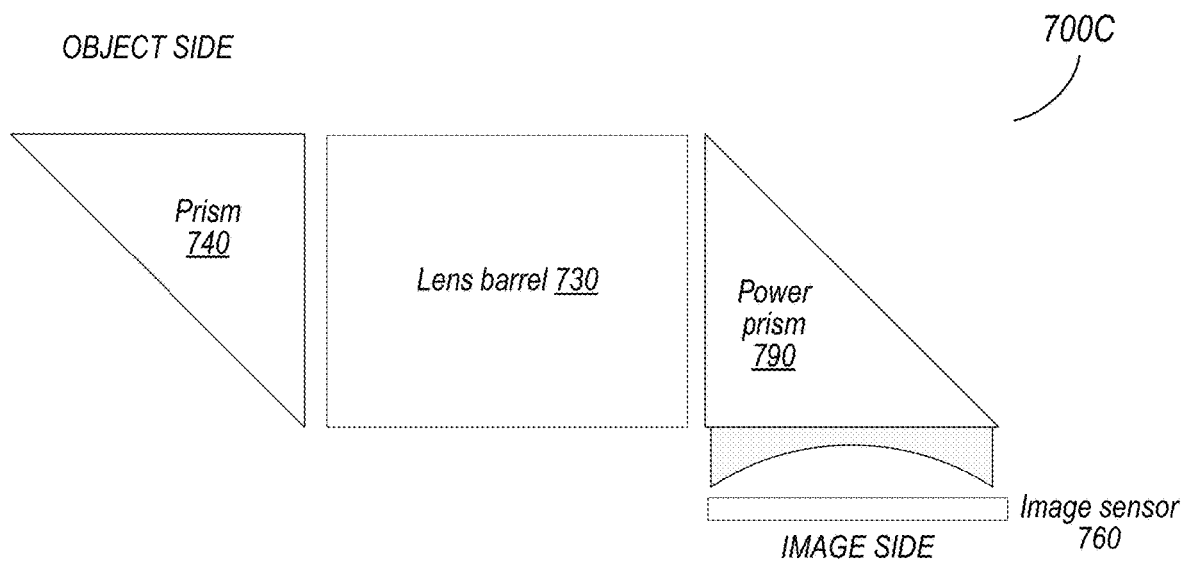
Figure 7D:
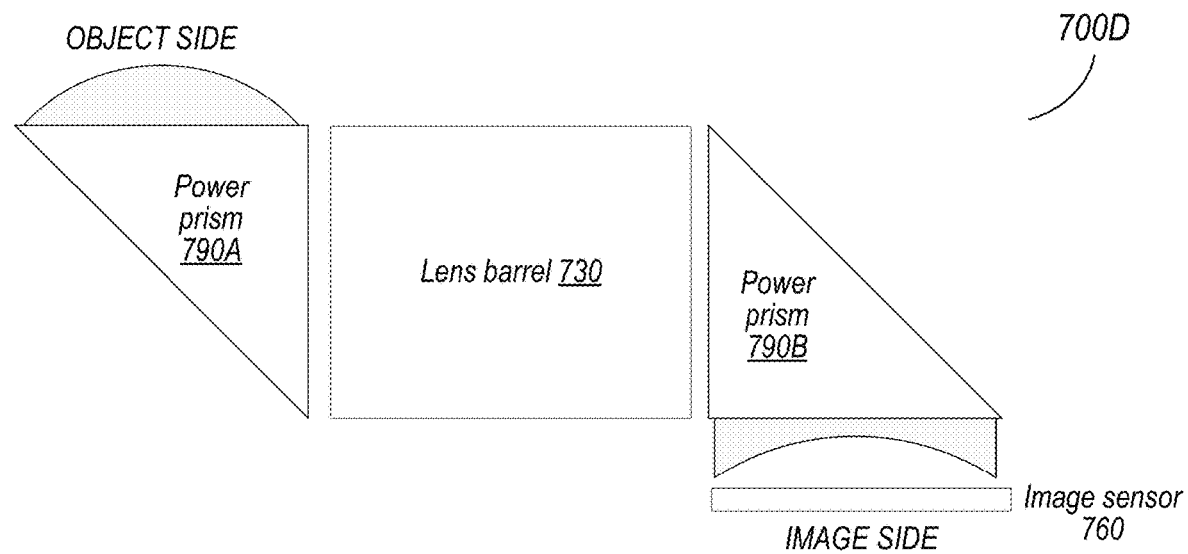

FIGS. 7A through 7D illustrate various embodiments of cameras with folded lens systems that include at least one power prism as illustrated in FIGS. 6A through 6F. FIG. 7A shows a camera 700A that includes, from an object side to an image side, a power prism 790, a lens barrel 730 containing one or more refractive lens elements, a standard prism 740, and an image sensor 760. FIG. 7B shows a camera 700B that includes, from an object side to an image side, a power prism 790, a lens barrel 730 containing one or more refractive lens elements, and an image sensor 760. FIG. 7C shows a camera 700C that includes, from an object side to an image side, a standard prism 740, a lens barrel 730 containing one or more refractive lens elements, a power prism 790, and an image sensor 760. FIG. 7D shows a camera 700D that includes, from an object side to an image side, a first power prism 790A, a lens barrel 730 containing one or more refractive lens elements, a second power prism 790B, and an image sensor 760.

FIG. 8 is a flowchart of an example method for capturing images using embodiments of a folded lens system that includes a power prism as illustrated in FIGS. 3 through 7, according to some embodiments. As indicated at 2000, light from an object field is received on a first axis, through an aperture stop, at the object side surface of a power prism. In some embodiments, the power prism may include a glass lens (e.g., a plano-convex lens with positive refractive power) attached to the object side of a prism. As shown in FIG. 6A, in some embodiments, an aperture stop may be located at the outer edge of the glass lens. As indicated at 2010, the light received at the object side of the power prism is redirected by the prism through an image side of the prism to a lens stack including one or more refractive lens elements on a second axis. In some embodiments, the power prism may include a glass lens (e.g., a concave lens with negative refractive power) attached to the image side of a prism. As indicated at 2020, the light received from the power prism is then refracted by the one or more lens elements in the lens stack to a second prism. In some embodiments, the second prism may also be a power prism that includes a glass lens attached to at least one surface of the prism. As indicated at 2030, the second prism redirects the light to form an image at an image plane at or near the surface of an image sensor or sensor module on a third axis. An image may then be captured by the image sensor or sensor module.

In some embodiments, there may be no second prism, for example as illustrated in FIG. 7B. In these embodiments, the lens stack refracts light to form an image at or near the surface of an image sensor or sensor module on the second axis.

In some embodiments, the light may pass through an infrared filter that may for example be located between the lens stack and the image sensor.

FIG. 9 is a flowchart of a method for manufacturing a power prism as illustrated in FIG. 3, according to some embodiments. As indicated at 2100, an optical glass wafer is molded to form a plurality of lens shapes on a first surface of the wafer, for example as illustrated in FIGS. 5A through 5C. As indicated at 2110, the molded glass wafer is ground and polished from a second surface to produce singulated glass lenses with no flanges, for example as illustrated in FIGS. 5D and 5E. As indicated at 2120, the singulated lenses are attached to surfaces of glass prisms using optical glue or optical contact to produce power prisms, for example as illustrated in FIGS. 5F and 5G.

Example Computing Device

Figure 10:
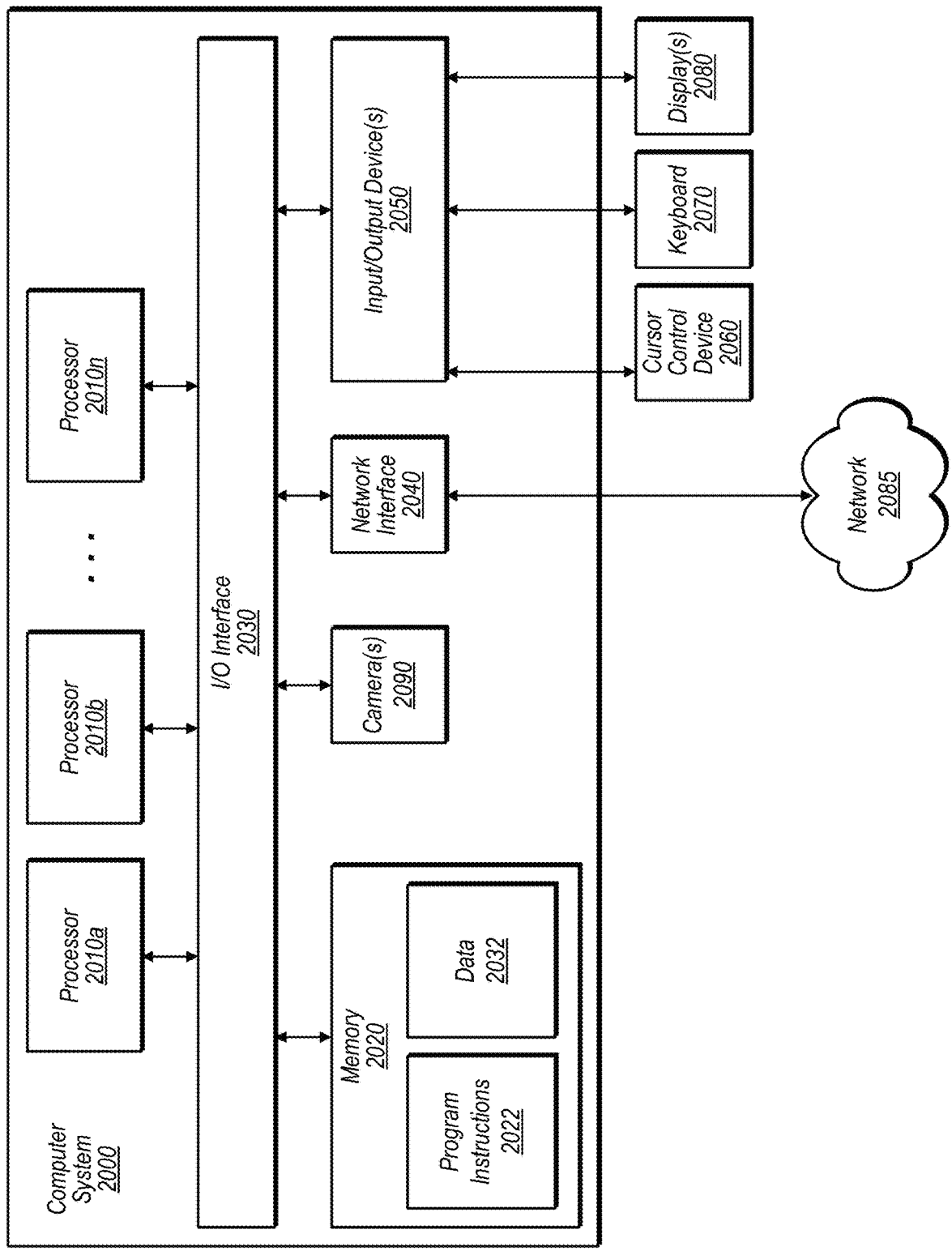
FIG. 10 illustrates an example computer system.

FIG. 10 illustrates an example computing device, referred to as computer system 2000, that may include or host embodiments of a camera with a folded lens system that includes at least one power prism as illustrated in FIGS. 3 through 9. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example at least one camera that includes a folded lens system with a power prism as described above with respect to FIGS. 3 through 9.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 10, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical power prism system, comprising:
   one or more prisms that each comprise a respective object-side surface, a respective reflective surface, and a respective image-side surface; and
   a first glass lens attached to the respective object-side surface of one of the one or more prisms, wherein width of an effective area of the first glass lens is the same as diameter of the first glass lens; and
   a second glass lens attached to an image-side surface of one of the one or more prisms, wherein width of an effective area of the second glass lens is the same as diameter of the second glass lens;
   wherein at least one of the first glass lens or the second glass lens is a plano-concave lens.

2. The optical power prism system as recited in claim 1, wherein at least one of the first glass lens or the second glass lens is composed of a glass material with an Abbe number that is >45.

3. The optical power prism system as recited in claim 1, wherein at least one of the one or more prisms is composed of an optical glass material with a higher refractive index than a glass material used in at least one of the first glass lens or the second glass lens attached to the at least one of the one or more prisms.

4. The optical power prism system as recited in claim 1, wherein at least one of the first glass lens or the second glass lens is composed of an optical glass material with a refractive index that is >1.5.

5. The optical power prism system as recited in claim 1, wherein at least one of the one or more prisms is composed of an optical glass material with a refractive index that is >1.7 to provide total internal reflection at the reflective surface of the prism.

6. The optical power prism system as recited in claim 1, wherein Z-axis height of the power prism system is within a range of 3 millimeters to 7 millimeters.

7. The optical power prism system as recited in claim 1, wherein in at least one of the first glass lens or the second glass lens is attached to a surface of one of the one or more prisms using an optical glue or by optical contact.

8. The optical power prism system as recited in claim 1, wherein at least one of the first glass lens or the second glass lens is a plano-convex lens.

9. The optical power prism system as recited in claim 1, wherein the first glass lens is a plano-convex lens, and wherein an aperture stop is located at an outer edge of the first glass lens.

10. A lens system, comprising:
    a plurality of elements arranged along a folded optical axis of the lens system, wherein the plurality of elements comprises:
      a power prism system that redirects light received from an object field from a first portion of the folded optical axis to a second portion of the folded optical axis, wherein the power prism system includes:
        one or more prisms, each prism comprising a respective object side surface, a respective reflective surface, and a respective image-side surface;
        a first glass lens attached to the respective object-side surface of one of the one or more prisms, wherein width of an effective area of the first glass lens is the same as diameter of the first glass lens; and
        a second glass lens attached to an image-side surface of one of the one or more prisms, wherein width of an effective area of the second glass lens is the same as diameter of the second glass lens;
        wherein at least one of the first lens or the second lens is a plano-concave lens; and
      a lens stack comprising one or more refractive lens elements that refract light output from one of the one or more prisms along the second portion of the folded optical axis.

11. The lens system as recited in claim 10, wherein one of the one or more prisms is located on the image side of the lens stack and redirects light received from the lens stack from the second portion of the folded optical axis to a third portion of the folded optical axis.

12. The lens system as recited in claim 10, wherein the first glass lens is a plano-convex lens.

13. The lens system as recited in claim 10, wherein the first glass lens is a plano-concave lens.

14. The lens system as recited in claim 10, wherein Z-axis height of the power prism system is within a range of 3 millimeters to 7 millimeters.

15. The lens system as recited in claim 10, wherein at least one of the one or more prisms is composed of a material with a refractive index that is >1.7 to provide total internal reflection at the reflective surface of the prism.

16. The lens system as recited in claim 10, wherein the first glass lens is composed of a material with a refractive index that is >1.5.

17. A camera, comprising:
an image sensor configured to capture light projected onto a surface of the image sensor;
a plurality of elements arranged along a folded optical axis of the lens system, wherein the plurality of elements comprises:
a power prism system that redirects light received from an object field from a first portion of the folded optical axis to a second portion of the folded optical axis, wherein the power prism system includes:
one or more prisms, each prism comprising a respective object side surface, a respective reflective surface, and a respective image-side surface;
a first lens attached to the respective object-side surface of one of the one or more prisms, wherein width of an effective area of the first lens is the same as diameter of the first lens; and
a second lens attached to an image-side surface of another one of the one or more prisms, wherein width of an effective area of the second lens is the same as diameter of the second lens;
wherein at least one of the first lens or the second lens is a plano-concave lens; and
one or more refractive lens elements that refract light output from the one of the one or more prisms along the second portion of the folded optical axis.

18. The camera as recited in claim 17, wherein the another one of the one or more prisms is located between the one or more refractive lens elements and the image sensor and redirects light received from the one or more refractive lens elements from the second portion of the folded optical axis to a third portion of the folded optical axis.

19. The camera as recited in claim 17, wherein Z-axis height of the power prism system is within a range of 3 millimeters to 7 millimeters.

20. The camera as recited in claim 17, wherein at least one of the first lens or the second lens is a glass lens.

* * * * *